(12) United States Patent
Nelson

(10) Patent No.: US 7,933,904 B2
(45) Date of Patent: Apr. 26, 2011

(54) FILE SEARCH ENGINE AND COMPUTERIZED METHOD OF TAGGING FILES WITH VECTORS

(76) Inventor: Cliff Nelson, Concord, NC (US)

( * ) Notice: Subject to any disclaimer, the term of this patent is extended or adjusted under 35 U.S.C. 154(b) by 401 days.

(21) Appl. No.: 12/100,483

(22) Filed: Apr. 10, 2008

(65) Prior Publication Data

US 2008/0256067 A1 Oct. 16, 2008

Related U.S. Application Data

(60) Provisional application No. 60/910,934, filed on Apr. 10, 2007.

(51) Int. Cl.
 *G06F 7/00* (2006.01)
 *G06F 17/30* (2006.01)
(52) U.S. Cl. ......... 707/743; 707/749; 707/758; 715/200
(58) Field of Classification Search .................. 707/749, 707/758, 743; 715/200
See application file for complete search history.

(56) References Cited

U.S. PATENT DOCUMENTS

| | | | |
|---|---|---|---|
| 5,907,704 A | | 5/1999 | Gudmundson et al. |
| 6,684,205 B1* | | 1/2004 | Modha et al. .................. 715/205 |
| 6,701,318 B2* | | 3/2004 | Fox et al. ...................... 707/749 |
| 6,910,037 B2 | | 6/2005 | Gutta et al. |
| 7,689,910 B2* | | 3/2010 | Hennum et al. ............... 715/200 |
| 2003/0084040 A1* | | 5/2003 | Jeffrey ................................ 707/3 |
| 2003/0120639 A1* | | 6/2003 | Potok et al. ......................... 707/3 |
| 2003/0135495 A1* | | 7/2003 | Vagnozzi ........................... 707/3 |
| 2003/0172063 A1* | | 9/2003 | Gutta et al. ......................... 707/5 |
| 2005/0028096 A1* | | 2/2005 | Harrington et al. ........... 715/530 |
| 2005/0286753 A1* | | 12/2005 | Ho ................................. 382/141 |
| 2008/0082905 A1* | | 4/2008 | Martinez et al. .............. 715/205 |
| 2008/0195601 A1* | | 8/2008 | Ntoulas et al. ..................... 707/5 |

OTHER PUBLICATIONS

Gregory B. Newby—"Emprical Study of a 3D Visualization for Information Retrieval Tasks"—Journal of Intelligent Information Systems, vol. 18, Issue 1, Jan. 2002 (pp. 31-53).*
Lim et al.—"Improving Patent retrieval System using Ontology"—The 30th Annual Conference of the IEEE, Industrial Electronics Society, Nov. 2-6, 2004, Busan, Korea (pp. 2646-2649).*

* cited by examiner

*Primary Examiner* — John Breene
*Assistant Examiner* — Anh Ly
(74) *Attorney, Agent, or Firm* — Summa, Additon & Ashe, P.A.

(57) ABSTRACT

The main purpose of the software, system and method of this invention is to help produce better searches for people utilizing their context as represented by a vector. The system allows for files (including websites) to be tagged with a vector. If a provider wants a searcher to find that provider's files, the file must be tagged with the vector that is sufficiently close to the searcher's corresponding vectors. A search user inputs not only a text search but also the vectors that have been created to show the context and preferences of that search user.

17 Claims, 7 Drawing Sheets

|    | 1 | 2 | 3 | 4 | 5 | 6 | 7 | 8 | 9 | 1 |
|----|---|---|---|---|---|---|---|---|---|---|
| 1  | ROWS 1-5 RESERVED FOR SYSTEM ADMINISTRATION ||||||||||
| 2  |   |   |   |   |   |   |   |   |   |   |
| 3  |   |   |   |   |   |   |   |   |   |   |
| 4  |   |   |   |   |   |   |   |   |   |   |
| 5  |   |   |   |   |   |   |   |   |   |   |
| 6  |   |   |   |   |   |   |   |   |   |   |
| 7  |   |   |   |   |   |   |   |   |   |   |
| 8  |   |   |   |   |   |   |   |   |   |   |
| 9  |   |   |   |   |   |   |   |   |   |   |
| 10 |   |   |   |   |   |   |   |   |   |   |
| 11 |   |   |   |   |   |   |   |   |   |   |
| 12 |   |   |   |   |   |   |   |   |   |   |
| 13 |   |   |   |   |   |   |   |   |   |   |
| 14 |   |   |   |   |   |   |   |   |   |   |
| 15 |   |   |   |   |   |   |   |   |   |   |
| 16 |   |   |   |   |   |   |   |   |   |   |
| 17 |   |   |   |   |   |   |   |   |   |   |
| 18 |   |   |   |   |   |   |   |   |   |   |
| 19 |   |   |   |   |   |   |   |   |   |   |
| 20 |   |   |   |   |   |   |   |   |   |   |

WORDS ROWS 6-9

CONTEXT ROWS 10-19

Figure 10

FILE SEARCH ENGINE AND COMPUTERIZED METHOD OF TAGGING FILES WITH VECTORS

CROSS REFERENCE TO RELATED APPLICATIONS

This application claims the benefit of priority based on U.S. Provisional Patent Application Ser. No. 60/910,934 filed Apr. 10, 2007, which is incorporated by reference in its entirety as if set forth fully herein.

BACKGROUND OF THE INVENTION

The invention is a new electronic search tool for the internet, a wide area network, or even a local file server. According to the method disclosed herein, files are located and retrieved via vector-based mathematics by comparing vectors associated with words in a search string to other vectors assigned to words in a stored file (e.g., a web page). The invention encompasses several aspects generally related to retrieving desired files by assigning words within the files to unique points in space, wherein each point is defined by a mathematical expression. An overall mapping of vectors extends from a common origin to each point in space that represents a word. The method and computerized search tool disclosed herein determines whether the vectors are sufficiently proximate in space to show a match between the file and the search string.

The method of assigning words to particular points in space is useful in doing all types of automated (electronic) searches, including but not limited to searches on the internet, on business servers, or on a personal computer. Electronically matching words in a search string to words located on a particular point in space is conveniently calculated by using vector mathematics. That is, when vectors assigned to each word in a search string match vectors for words located on the n-dimensional object in space, the computer can quickly return the correct result. Vector mathematics uses quicker and easier computations than traditional text searches that most systems use today.

One of the most useful applications of file search tools is the Internet. Search engines known in the art use a crawler to search for pertinent descriptive information about a Website and to score it for applicability to the user's search. The descriptive information about the site is created by the site owner and may be valid or invalid as it is purely arbitrary and controlled by the person creating the website. The crawlers have no way to assess the veracity of the descriptors and lead to unexpected search results.

Crawlers from a variety of search engines retrieve descriptive information about a site and attempt to glean the value or rank of the site in terms of its usefulness to the searcher. The rank of the site is completely up to the algorithm of the software which varies from engine to engine.

Problems that exist with current technology include:
(1) Incomplete descriptors about the page
(2) False descriptors about the page
(3) Too many descriptors trying to cover too much ground
(4) Using hyperlinks located within a file to establish validity or rank The result is that users may end up with thousands of web sites that are ranked in order of importance by search engine criteria. The searcher, however, has no way to control the number or usefulness of search results. A need exists in the area of search engine development for faster and more accurate search results that avoid the above-enumerated problems. One method of doing so is by using vector mathematics in the search process.

Prior efforts to utilize vector mathematics in search engines have been outlined in part within previous publications as follows:

U.S. Patent Application No. 2003/0120639 (Potok), now U.S. Pat. No. 7,072,883, uses a vector space model to store documents for internet searching. The Potok vectors, however, are not related to any particular point in space on which individual words are located. Instead, Potok uses a method by which each unique word in a collection of documents represents a dimension in space, and each document in this space is represented by a vector. Potok continues to count distinct words in each document and weighting the words according to their frequency of occurrence in a set of documents. The vector representing a particular document is determined by its composite weight of certain words. In the Potok method, vector mathematics is used to compare documents in which individual words have been counted.

U.S. Pat. No. 6,684,205 (Modha) discloses a method of organizing data, such as documents on the web, by clustering similar documents into the same group. Modha represents each document in the cluster as a triplet of unit vectors. The first vector represents the words contained in the document. The second vector represents outward bound links to other documents from the document of interest. The third vector represents in-links to the document of interest. Each document expressed by the triplet of vectors lies on a torus in space. Modha uses vector analysis to compare documents, assess their similarity, and cluster the documents accordingly.

U.S. Pat. No. 6,910,037 (Gutta) identifies a system and method for processing search results on the internet. Gutta does not provide a new way of searching per se. After a search has been performed in a traditional term search, Gutta analyzes the resulting document set to determine the term frequencies in each document. Each term in each document can be expressed by a vector with a value based on term frequency. Each document, therefore, is expressed as a resultant vector of the individual term vectors that make up that document. Gutta uses vector mathematics to compare the resultant vectors of each document and organize the documents accordingly. This grouping is known in the art as "clustering" the similar documents together. In this way, Gutta can display like results together as a group. Gutta still relies upon traditional searching by analyzing and matching individual characters and words within each document to achieve a search result. Gutta's goal is only to cluster the search results for displaying to the user.

A need still exists in the art of electronic file searching to provide access to search results faster and more accurately by analyzing individual electronic files on a more fundamental level. The invention herein meets this need.

BRIEF DESCRIPTION OF THE FIGURES

FIG. 10 is an example of a user defined database array according to this invention.

SUMMARY DISCLOSURE OF THE INVENTION

Figure 1:
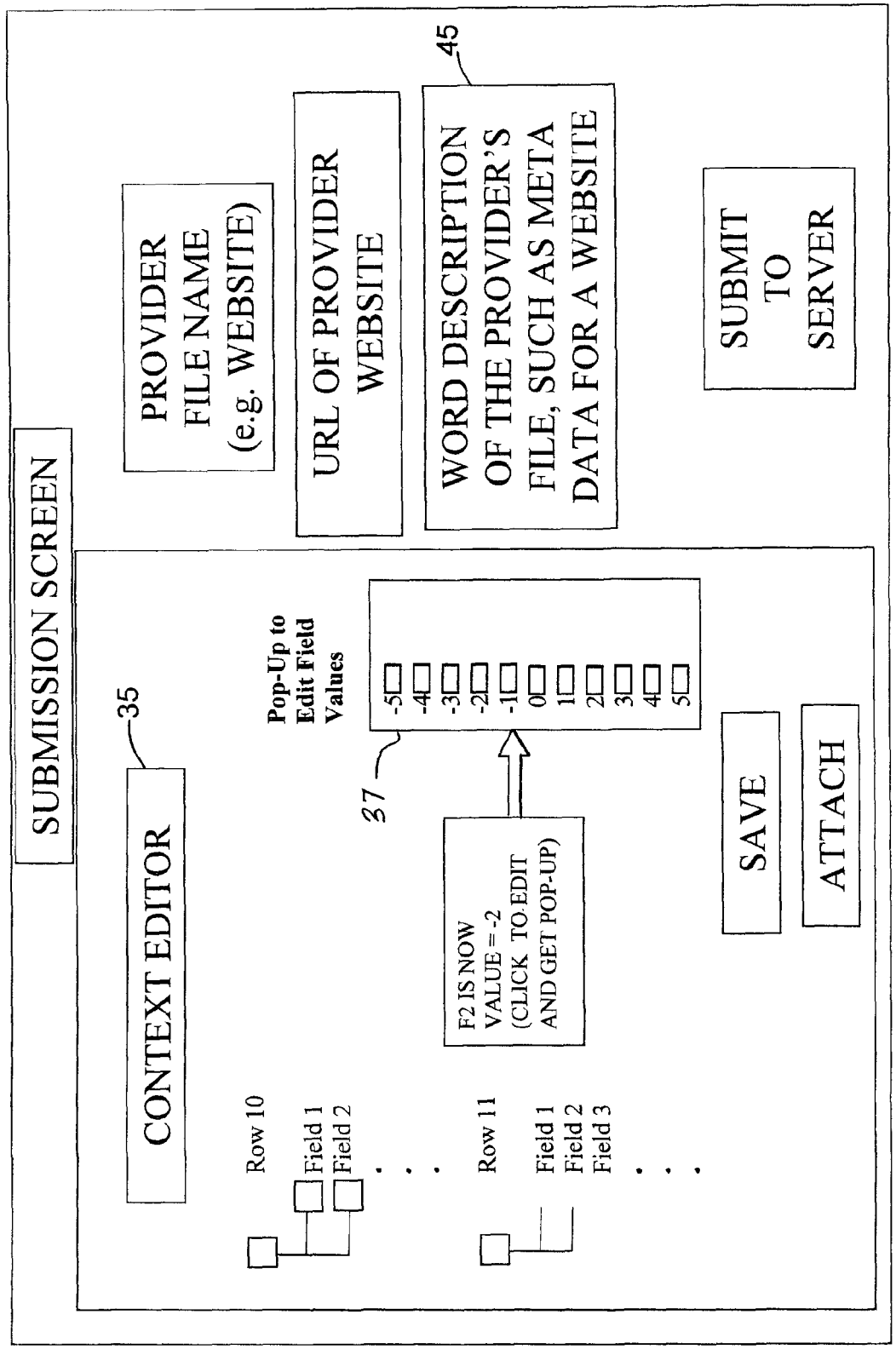
FIG. 1 is an illustration of the screen by which a file creator submits the file profile to a server used in accordance with this invention.

The main purpose of the software, system and method of this invention is to help produce better searches for people utilizing their individualized searching and filing context as represented by a vector. The system allows for files (including websites) to be tagged with a vector. If a content provider wants a searcher to find that provider's files, the files must be tagged with a vector that is sufficiently close to the searcher's corresponding vectors. A global filing system searcher, a.k.a. a system user, inputs not only a text search but also the vectors that have been created to show the context and preferences of that search user.

After ensuring that a content provider's file descriptors and all of the searcher's input search terms are in the appropriate vector format, the system compares the search vectors with the file vectors in the system by calculating the theta angle between the vectors.

The system provides the user with a way to ensure compatibility of search results by specifying the range of theta angles that would be acceptable. A theta angle of zero degrees would be very limited as it requires a perfect match. A theta angle of 10 degrees opens up the search to yield more results. A theta angle of 50 degrees yields more varied search results.

The system further provides a way for a global filing system searcher to tag a search result with a feedback value. The searcher on a global filing system creates a search vector, and the URL/vector combination will go back to the server for further processing in light of the feedback value from the searcher/user. Over time, as other users with similar context values rate the site as a bad site, the theta angle for that site will swing outside that type of user's requirements.

DETAILED DESCRIPTION OF THE INVENTION

The problem with word based search engines is that words alone are not enough to describe exactly what a user may be looking for in a database. Two different people can key in the same phrase and get the same result, for instance, a URL to a website or file location. One person may live in India and the other person may live in the United States. Even when these people are typing in the same key words for searching, their subjective perspectives may include different preferences for results that are unaccounted for in a simple text string.

The key to improving the search is for the users to attach their context to the search request (e.g., descriptions about who they are, where they live, what language they speak, what they do for a living, what they drive, their income, what level of education have they achieved, etc.). That search request, which includes words plus context information, is sent to a server for processing a match. Users can adjust the amount of context used in the search request to maintain a sufficient level of privacy, but the context information helps ensure that a search string incorporates more individualized information for pinpointing better search results. Although this general principal allows a more accurate search result, the computerized method and searching system disclosed herein includes further refinements to ensure that search terms and context values are more efficient than traditional character-based string matches.

The search method, computerized system and software disclosed below address deficiencies in word searches by augmenting the keyword match or meta-tag match by using mathematical vectors to describe exactly what the website is stating and what the searcher's preferences are. A calculation is made to determine if the user and the site are a good match. If so, the search result that the user sees includes only the closest matches. In another embodiment, search results can be color-coded to represent the degree of matching. Alternatively, matches that are only close matches will be shown in the appropriate color. Users also have the ability to search on web sites that do not come close to their preferences to see what they might be missing.

Certain terms in this Detailed Specification are used for convenience and clarity without limiting the invention. The computerized product and computerized method disclosed herein may be referred to as simply a "system." In general, without limiting the scope of the invention, the "system" incorporates a computer readable storage medium with commands that are executable by a processor for a desired electronic result. A "searcher" or a "user" means, without limitation, any person or entity that requests a listing of files related to certain terms or topics, referred to generally as "search requests." The words, phrases, numbers and the like associated with a file on the global network are referred to herein as "file descriptor text elements." The words, phrases, and numbers associated with a user's input are referred to herein as "search term text elements."

The system, which may be a computerized method or a computer program product, allows a user to input data for a file search (i.e., search term text elements) in a familiar character string format, but the system converts all character strings used in this process into vectors, primarily through look-up tables in databases. These vectors are then placed in a particular database format for use in the system for both uploading data and for uploading a search request. See FIGS. 1 and 2.

Figure 4:
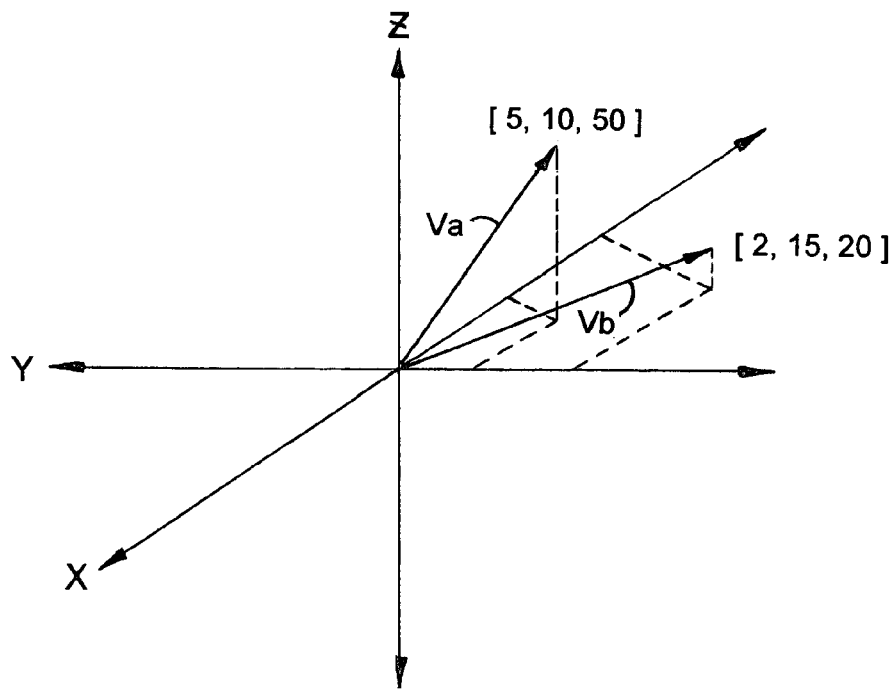
FIG. 4 is a schematic example of vector coordinates from a common origin.
Figure 5:
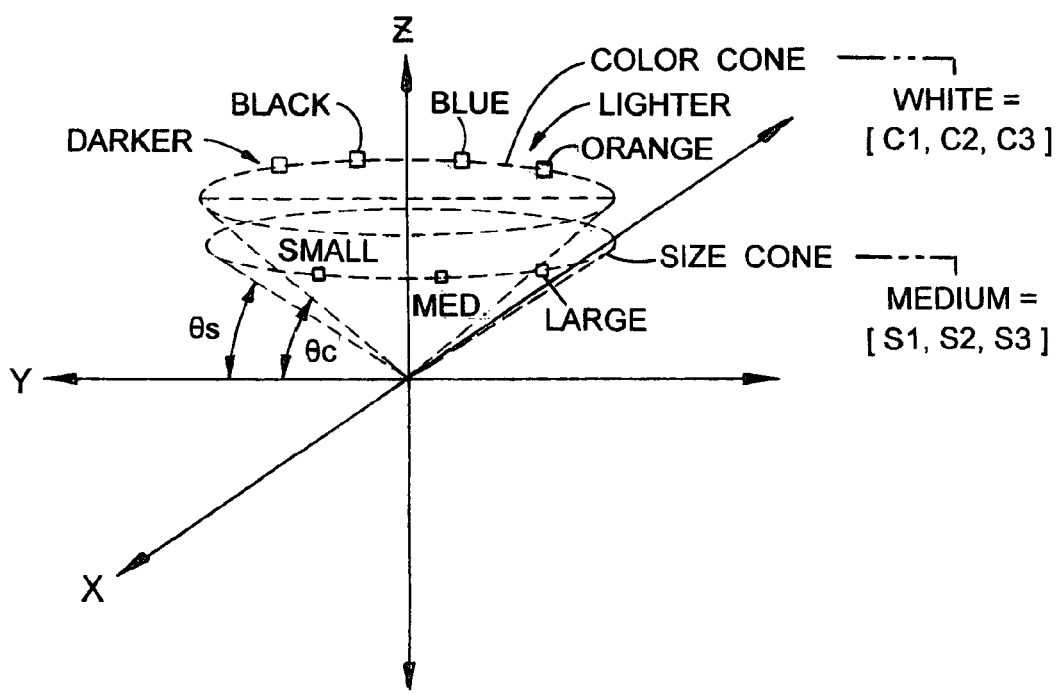
FIG. 5 is a schematic example of placing words in three dimensional points in space and grouping the words onto a shape such as a cone.
Figure 6:
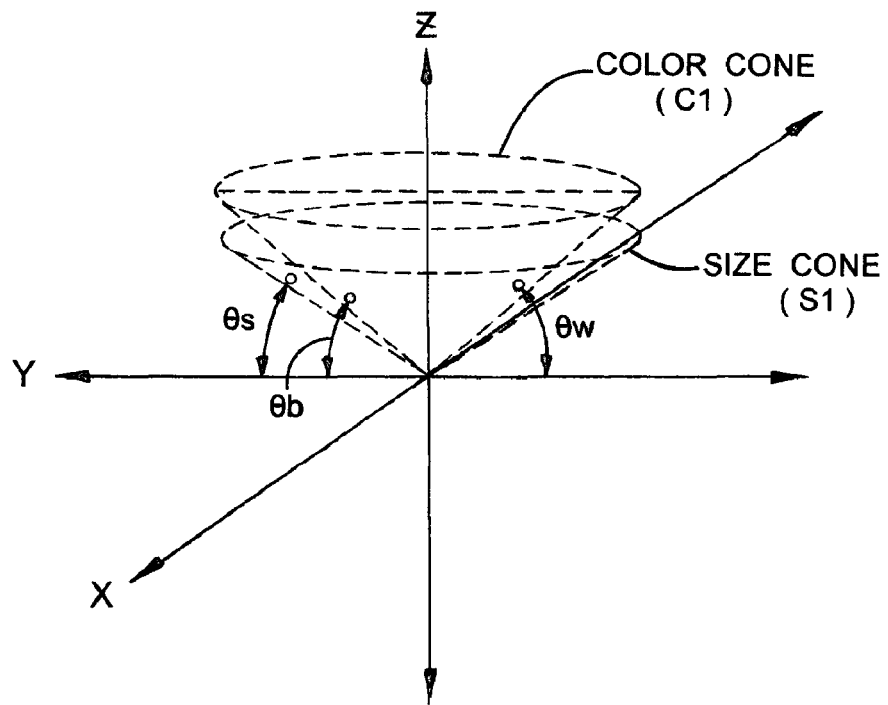
FIG. 6 is an example of calculating the angle between words positioned on two different spatial figures representing groups of common words.
Figure 7:
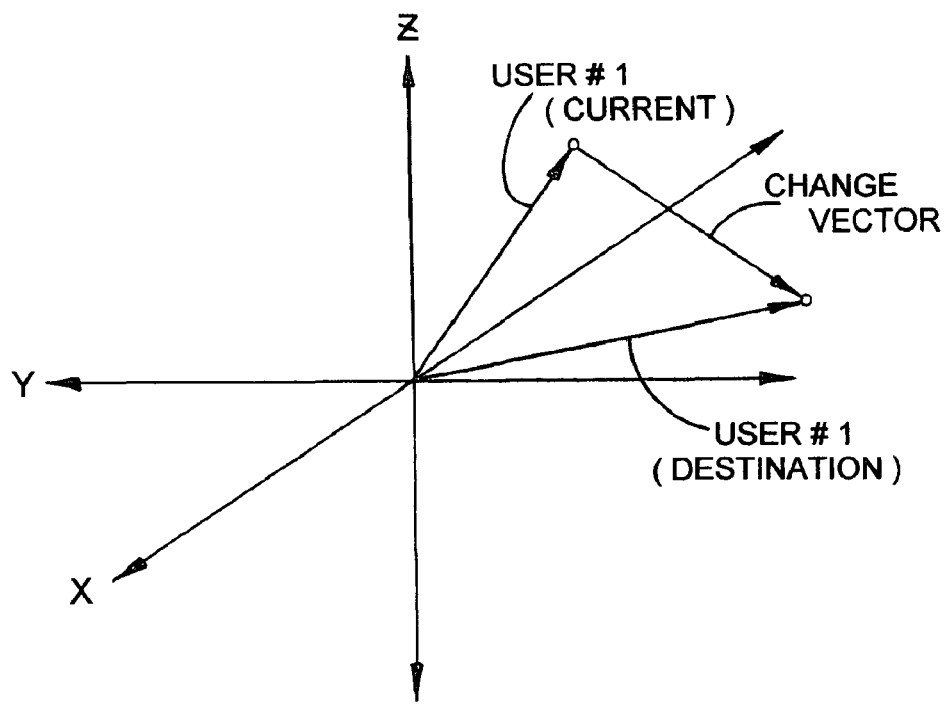
FIG. 7 is a schematic showing the arrangement of a search engine provider's database that includes context information for a searcher's preferences and a file creator's context.
Figure 8:
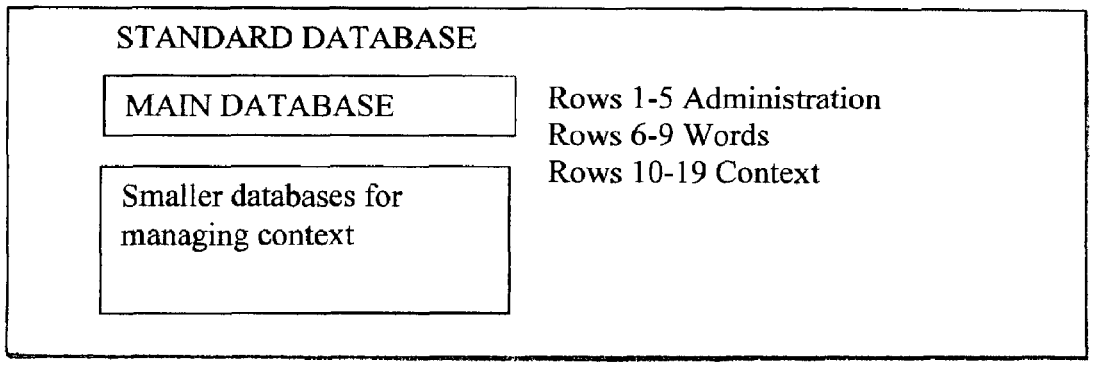
FIG. 8 is a flowchart showing the steps that a provider follows in uploading searchable information into the system of this invention.
Figure 9:
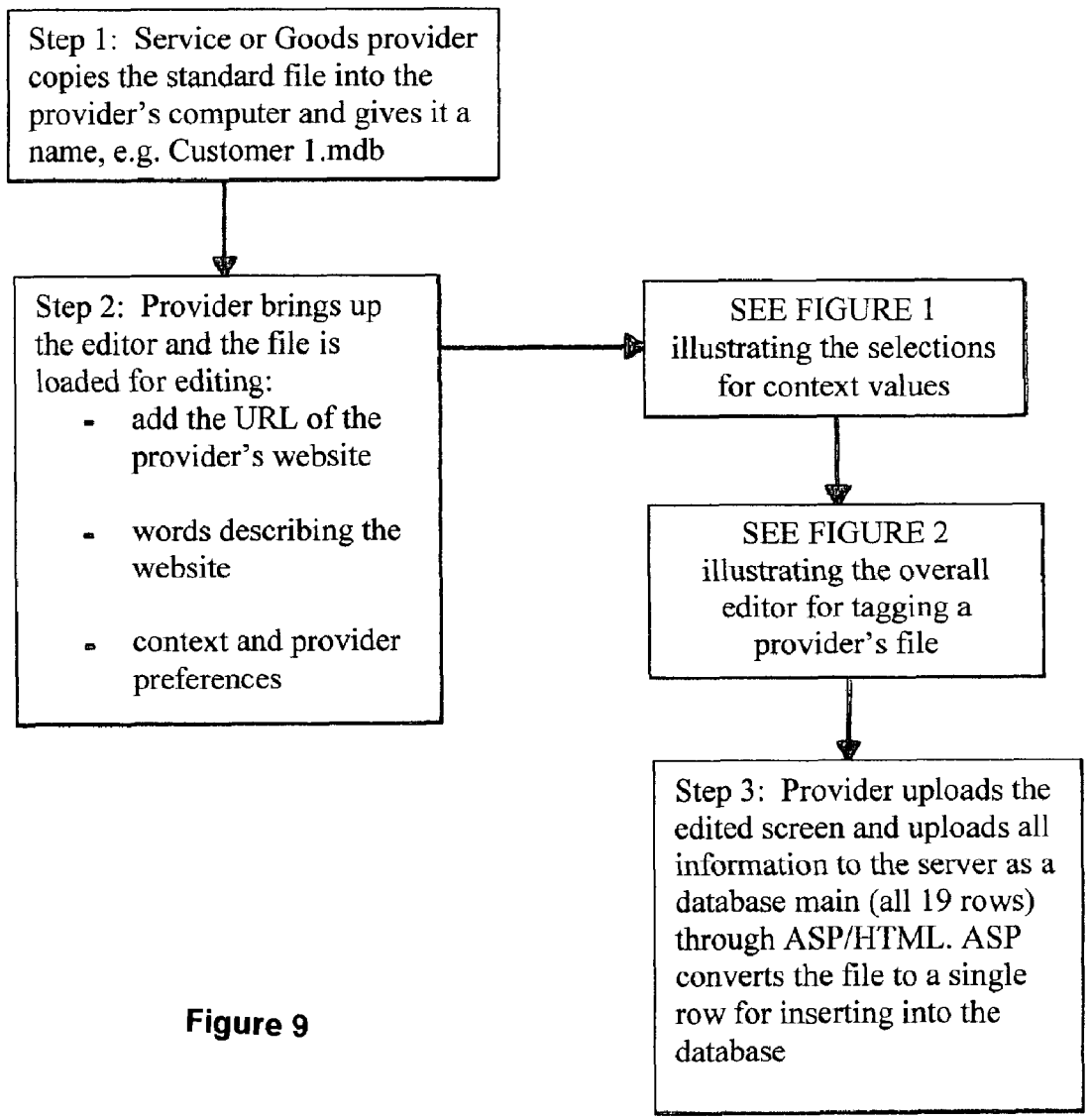
FIG. 9 is a flowchart showing the steps that a search user follows in searching via the system of this invention.

The software performs a calculation of the inner product angle between the user's search request vector and each corresponding vector in each row of the database. Results have to meet the user requirements in terms of a value, referred to herein as "theta" as shown in FIGS. 4-6.

Overall, the system can be described as having three potential parts: (1) a server that includes the software for conducting file searches by comparing vectors associated with different files; (2) a file provider, also referred to as a content provider, that would like to make its file available as a search result; and (3) a searcher, or user, that would like to input a search request and locate useful files from file providers.

This system utilizes vectors associated with (1) files to be searched and (2) the search request. The server incorporates a main database with a record for each file provided and made available on the system for searching. The main database vendor has individual records for each file, and those records include vector coordinates for each keyword that describes that file. When the user uploads a search request, that search request includes data in vector format describing that search user's context and preferences along with the text of the search. On the server side, the system will calculate the angle, theta, between the vectors associated with provided files and the vectors associated with the search. The smaller the value of theta, the closer that search result is to the desired file.

As an example, assume that a search user's preferences can be summarized by four words associated with four respective vectors. These four words are located at four sets of three dimensional coordinates (although the invention is not limited to any particular number of dimensions) and represented by the following 4 vectors:

$V1=3x_1+4y_1+2z_1$ (i.e., a search term text element positioned at coordinate (3, 4, 2)).

$V2=5x_1+5y_1+1z_1$ (i.e., a search term text element positioned at coordinate (5, 5, 1)).

$V3=1x_1+1y_1+1z_1$ (i.e., a search term text element positioned at coordinate (1, 1, 1)).

$V4=4x_1+2y_1+3z_1$. (i.e., a search term text element positioned at coordinate (4, 2, 3)).

On the server side, a given provider file is tagged with the following vector:

$V5=4x_5+2Y_5+4z_5$ (i.e., a file descriptor text element positioned at coordinate (4, 2, 4).

The system will calculate the angle theta ($\Theta$) between V5 and each of the search user's vectors V1 to V4 using the following formula:

$$\Theta = \cos^{-1}(\text{Dot Product of Vectors/Product of Vector Norms})$$

Example for Formula: Vector $A=a_1i+a_2j+a_3k$ Vector $B=b_1i+b_2j+b_3k$

Norm Vector $A=SQRT(a_1^2+a_2^2+a_3^2)$ Norm Vector $B=SQRT(b_1^2+b_2^2+b_3^2)$

The resulting theta value shows how close that search user's context value is to the provided file's content as represented by vectors.

In another embodiment, the system will take all of Vectors 1-4 from the user and add them together so that Vector 1+Vector 2=Vector$_{12}$. The system then takes the opposite of that sum and adds the negative value to the vector quantities associated with a given provider file. If the total is zero, then there is a match. The same process will work by taking the cross product of all the search user's values, getting the negative, and adding to a file vector to see how close to zero the sum is. The closer to zero the sum turns out, then the match is closer to the desired result.

The system and software described herein utilizes a look-up table to convert words to an associated standardized vector. In other words, the software search engine provider utilizes the method disclosed herein to incorporate two standard products into its business. First, search users and providers will receive standard mini-databases to customize for their application. See FIG. 3. Second, the search engine will utilize a master look-up table that has assigned all words in any given language a vector directed to a unique point in space. These points in space may be grouped so that symbols and words related to a particular category are located on the same object in an n-dimensional coordinate system. This look-up table is a standard database of word-symbols-vectors.

Getting the String Data into Vector Format

One component of the software and system described herein is that it utilizes context data that an individual user customizes to attach to search strings. String context data (age, salary, occupation, favorite color, etc.) and words in the search request need to be converted to vectors for use in the system. Context and words are handled differently. There are two databases used: one for context lookup and a second for word lookup.

Context Data Conversion

For context lookup and conversion to vectors, the software includes a ratable context database that is completely flexible for any use. Users copy a pre-defined (unrated) database (FIG. 2, Ref. 10) and using the editor (15) can select items for rating, such as age, height, favorite color, etc. which would be set forth in fields (20). The user can edit the Context (it comes in a long tree-view list) for preferences and store the values in a mini-database that should be saved on the user's computer. See FIG. 3.

Figure 3:
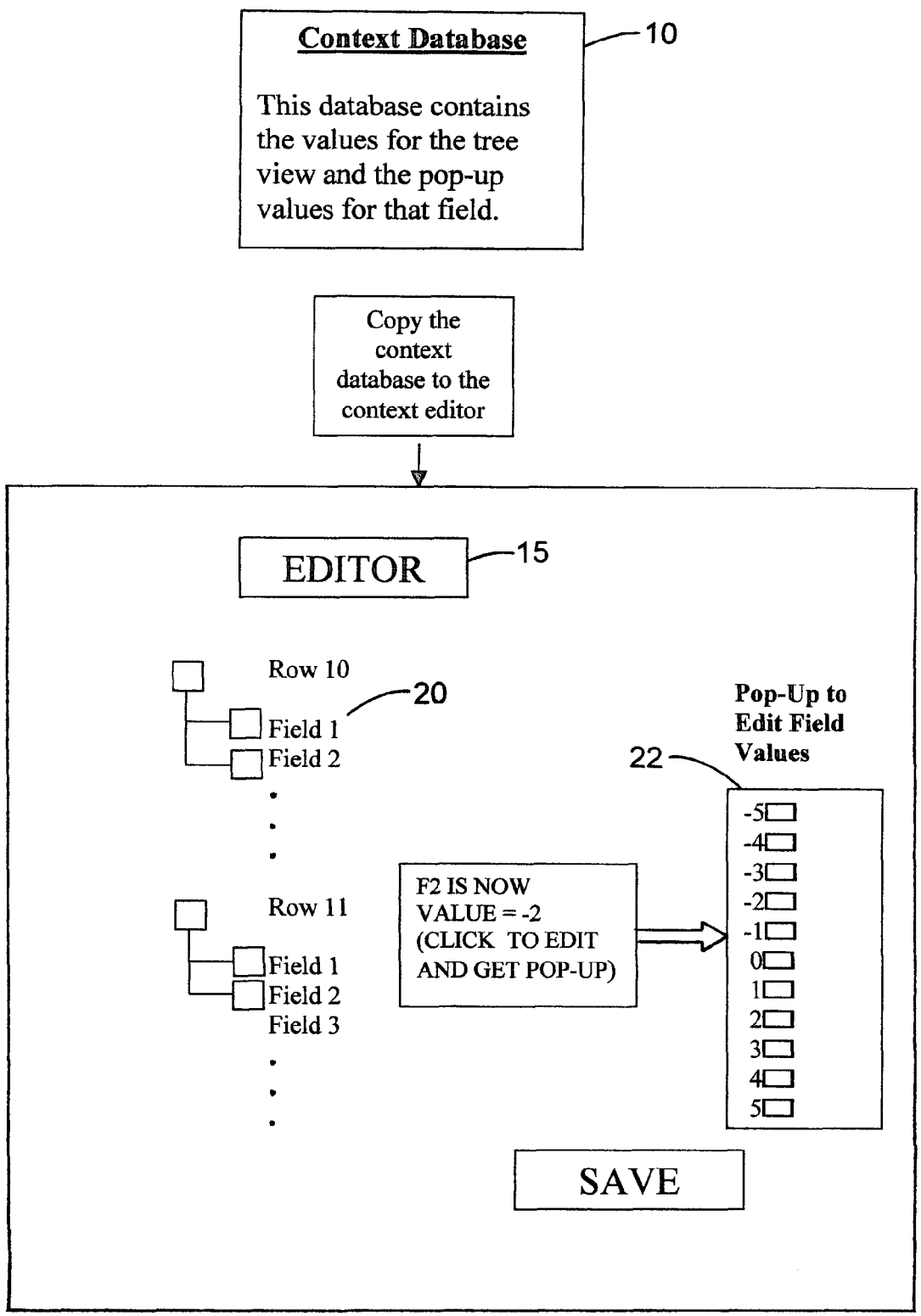
FIG. 3 is an illustration of the context editor for either a search user or a file content provider in accordance with this invention.

Instead of storing ratings that are text based, such as "age=49" or "favorite color=blue", the system disclosed herein converts these quantities to numbers such as 49, or 432145 or even as vectors such as [49,0,0] or [0,0,255]. The context database editor (15) displays items (20) to rate and gives a choice of what to pick. The user picks the value (22) and the value is stored in the user's personal mini-database. If necessary, the editor (15) will take a user's selection, look up a value in another table and write that lookup value to the mini-database. FIG. 3 shows one embodiment of the context editor according to this invention.

FIG. 1 shows an embodiment of the file provider submission screen that uses a similar context editor (35). The individual data in the submission screen of FIG. 1 make up that which is known as "file descriptor text elements." The file descriptor text elements include spaces for a file provider to submit the filename (e.g., a website) and a description of the file in words (45). The tool set forth in FIG. 1 allows a content provider, such as a corporate entity interested in setting up a website, to rank specified qualities associated with that site. For instance, in a website for sporting goods, each field in a row of the file context editor (35) could represent the availability of a certain piece of equipment. The sporting goods supplier could rate certain fields extremely high if that piece of equipment is available and certain fields very low if not available. If a certain piece of equipment is likely never to be available, then an extremely negative value could be placed in that field. In the example of FIG. 1, the content provider clicks on a field to edit, (e.g., Field 2 with a current value of −2). A pop-up menu is available to edit the ranking of that field to a different value. The values available via the pop-up menu coincide with the positive or negative ranking of that field. In the sporting goods example, for a piece of equipment that will never be available, the content provider would edit the field associated with that equipment to a value of −5, the lowest rating. If the content provider has the exact piece of equipment currently in stock, that rating would be closer to +5.

The Meaning Behind the Numbers

Assuming for example that the Context Database contains only one thing to rate, such as age, one could say that the Context is a one-dimensional vector, with the age value as the component of a unit vector in that one dimension. A unit vector could be represented as "i," and the vector could be represented as Vector (a)=49i.

In a different example, the Context Database may include three ratable elements regarding the user, e.g., age, height, and favorite color. The context for a search can then be represented as a single, three-dimensional vector with components age, height and color represented as a respective number. A unit vector in three-dimensions can be referred to as i+j+k. A rated vector could be represented as a vector in three-dimensions:

Vector(a)=(age)i+(height)j+(colornumber)k i.e. 49i+60j+4239k

This is the "age-height-favorite color" vector.

In yet another scenario, the Context Database may include any quantity "n" of the ratable values to fully describe the user context and preferences, e.g. nationality, religion, liberal v. conservative, kids v. no kids, etc. Instead of using i, j and k for the orthogonal unit vectors, this example can use e1, e2, e3, etc. just to make it easier to write out a large vector without resorting to double letters and such. The resulting context vector would be represented as:

Vector($a$)=(value1)$e1$+(value2)$e2$+(value3)$e3$+value(4)$e4$+ . . . +(value $n$)$e(n)$.

This is the "complete" context vector.

In one embodiment, the users can rate 100 values. These are converted to numbers and used as the components in a 100-dimension Vector that represents the user's search context. The n in the above vector would be equal to 100.

How many dimensions would one need to adequately describe a user or their needs? In an exemplary embodiment that in no way limits the invention herein, a database of 37 categories has 10 rows and 10 ratable elements for each row for a total of 3700 dimensions. Ultimately, the database is expandable. See FIG. 2.

Calculation of Theta Between Two Context Vectors

After converting the Context into a number, and then using the numbers as components in one large vector, one must calculate the theta value. A sample calculation between two vectors and their resulting theta value follows. The example includes a limited number of the vector components (only three values), but this can be increased to any number as described above.

User 1=Vector $A=5e_1+10e_2+50e_3$

User 2=Vector $B=2e_1+15e_2+20e_3$

Inner product formula is Vector A·Vector B=‖Vector A‖‖Vector B‖ cos Θ

$\|Vector\ A\|$=SQRT $(a_1^2+a_2^2+a_3^2)$ $\|Vector\ B\|$=SQRT $(b_1^2+b_2^2+b_3^2)$ Dot Product $AB=(a_1b_1+a_2b_2+a_3b_3)$ Θ=arc cos(Dot Product $AB$/‖Vector $A$‖‖Vector $B$‖)

Word Data Conversion

For word lookup and conversion to vectors, the invention includes a database that resides on the server called the word-vector database. This database contains any word, number, slang term. etc. and its associated vector. Each word is assigned to a unique vector location in space. For example, the word "fire" might be located at position (2, 34, 40) and "hydrant" could be located at some other position, say (43, 25, 19).

One important feature is that words of similar type are grouped in particular arrangements to allow easier understanding of the results of word-theta matches. For instance, color words would be located on a conic section ranging from low to high values around the z-axis. Also, names can be located on another conic section arranged alphabetically around the z-axis. This will help the search engine understand that "red" on one conic section (which represents a color) is different than someone nicknamed "Red" on another conic section (for proper names). See FIGS. 4-6.

Whenever a user creates a search request, the software and system of this invention will take the request, get the words, or text elements, in the request, and build a list of vectors for each word by looking up the vector values for each word. Similarly, individuals and companies who upload data will have a description of their file in words. The system will get the words in the description of that file, and look up the associated vectors for those words. The system will store the provider's file, associated word vectors, and any context values in each row of the database.

TABLE 1

WORD - VECTOR DATABASE

| Word | X coordinate | Y coordinate | Z Coordinate |
|---|---|---|---|
| Abacus | N1 | N2 | N3 |
| . . . | | | |
| . . . | | | |
| Medium | S1 | S2 | S3 |
| . . . | | | |
| White | C1 | C2 | C3 |

Calculation of Theta Between Two Vectors

This process is similar to Context calculations. Vector tag can convert a search request string into a large vector, using the values of the words as components of the vector. The search user can upload words, such as "medium white dog" to the server, and that user's context will be attached to the search with all words in the text and context being converted to vectors. The system compares the user words and user context with the vectors assigned to various other files (websites, databases, any file in electronic format). If the word vectors previously associated with a particular file are compared to the search vectors, and the theta values are sufficiently close, then the search is a match and that file becomes part of the result.

Handling Provider and User Data

Before explaining more details regarding the operation of the system, it is important to note that the data involved is managed through the use of a small database file, containing a number of rows and columns. The database is used in storing vector conversions of strings, storage of words, and uploads by providers and uploads of search requests by users. It also adds security features by forcing users to comply with this specific format to prevent direct access to the server database and general hacking.

Standard Mini-Database

A standard mini-database is used by all searchers and content providers of the system to help manage storage of converted strings to vectors, storage of words, uploading provider data to the server and uploading search requests by users.

The structure of the mini-database that gets uploaded to the server is illustrated in FIG. 10. The standard mini-database is downloaded by the users of the system, edited, and stored by the search user for performing searches or uploading data. Although words are the same for everyone using the system, the words are treated differently depending on whether the words are input by a search user or a file provider (content provider) to the database. For example, the providers will add words to the mini-database that will describe what the file (description of a website, word document, etc.) represents. Search users will add words to the mini-database that will be used as the search string for looking for files in the database. But in any case, the mini-database is the same structure for both.

The system is set up to go deep rather than wide due to limitations in the columns available in the database. In the example of a searcher using the mini-database, the search words, or text elements, are set forth in rows 6-9, while the previously populated context data (e.g., FIG. 3) are set forth in rows 10-19. In the table illustrated above, when the table is uploaded to the server, the Field (column) values in Rows 10-19 are converted to a string of data for storage as a single vector.

Vector $A$=string[Row 10, then Row 11, then Row 12, then Row 13, then Row 14 . . . ]

A content provider's Vector B is manipulated the same way for theta calculations between Vector A and Vector B.

The Context values are stored in the mini-database, which is referred to herein as a rated vector mini-database. A rated vector mini-database is known as a Rated Vector Object ("RVO"). The RVO has rated context values to form the Context Vector but no information in words—that area is blank.

Words will be added to the RVO to become a Word-Complete RVO. Unlike the context values being assigned vectors immediately through the editor, the Words that are added to the RVO are words only. They are not vectors yet. Due to potential issues with lookup tables, and problems with distribution of lookup tables to clients, the system performs all lookup conversions of words to vectors on the server. It is more efficient to update the word-vector database at the server level.

In one embodiment, the word portion of the mini-database can hold up to 40 words and their associated vectors. Providers use these fields to describe their site. Users use the field for the words in their search request. When the provider data is loaded up to the server, the words are rearranged into a single row. The database on the server looks more like this:

TABLE 2

| Word | Vector | Word | Vector | Word | Vector |
|---|---|---|---|---|---|
| Apple | [8 10 18] | Juicy | [17 33 54] | Peeling | [4 36 87] |

Software Operation Model

The software and associated system allow users to perform context-based searches combined with word-phrase searches on a database which contains context-enabled information and word descriptions within each file on the database.

When a user submits a search, he or she is sending the information in the mini-database to an ASP page on the server. Although one could have the mini-database uploaded as a file for processing, for security reasons, the system opens the mini-database on the client's computer and puts the data row by row into an ASP page as temporary variables. The context values are already numbers but the word vectors need to be looked up in a vector conversion look-up table.

The ASP page then opens the word-vector database and gets the lookup vectors for each word and these vectors are stored as temporary variables.

The ASP page, now loaded with complete vectors for both words and context, opens the database. Then for each row in the database, the ASP page looks for a match on the word vectors first, and if a match is made, the system performs the Context calculation. If the theta meets the criteria set by the User, the system writes that URL (or file name as the case may be) as a search result back to the user's browser. See FIGS. 1-4

The software of this invention provides a robust means of comparing two vector objects for similarities by using the theta ($\Theta$) angle inner product. As an example of use, one could imbed the context data and other descriptors into any file (audio, video, mp3, jpegs, text documents, websites, etc.). This is possible because the system converts the component values into a binary string Operating Embodiment The software and system of this invention, in its current embodiment, is a package of three individual software programs, that work together to produce a method which will:

allow Providers of the system the ability to associate, or tag, personal preference settings of a hypothetical User in the form of Vectors and tag word descriptions of the file in the form of Vectors;

allow Providers the ability to save vector-tagged URL files to a database; and allow Users of the system to find the Providers' vector-tagged records in a vector-tagged database Server by Searching on personal-preference-vector matches, word-description-vector matches, and/or user-feedback-vector matches. Matches are calculated using vector-based functions.

Users may specify the level of quality of the match for the word description vectors, personal preference vectors, and user feedback vectors by specifying the allowable maximum angle between the Search Vectors and the Vectors of the tagged database records.

Figure 2:
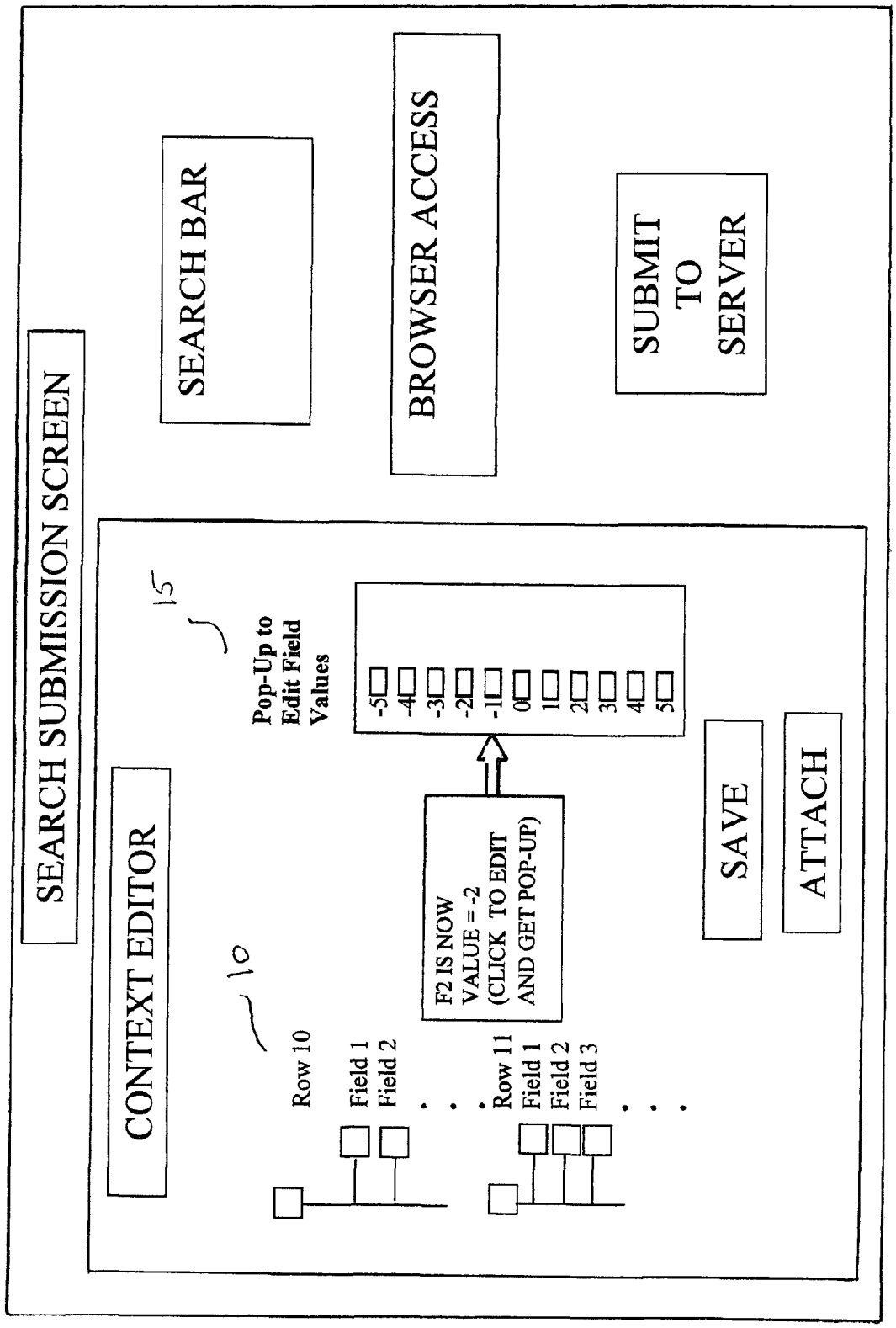
FIG. 2 is an illustration of the screen by which a search user submits a search with context data to a server used in accordance with this invention.

Both the Providers and the Users of the system will need to download a standard file of ratable elements from the Server, edit the ratings, store the edited file on their respective systems, and utilize the files. The ratable elements provide a series of context fields associated with either a user or a particular file. The fields are subjective quantities that an individual scores to indicate more information about the user or the file. Providers attach their web or file URL to the edited file (FIG. 1), and users performing searches attach the edited file to the Search request (FIG. 2).

The Server will receive the files from the Providers and Users and will process the data as needed. Provider data gets converted and uploaded to the Server database, and a User search request will be converted to a form to allow searching of the provider database. Any matching results will be sent back to the User.

Vector-Tagged File Technology and Proposed Process

There are three working elements to the system as follows:
(1) Provider Uploads the Vector Tag Database.

Providers are the service and product sellers on the system. They are file content providers who create and own the files that a user wishes to search. Content providers download one of the software packages that allows them to tag their company's URL with Words and Context data and to upload the package to the Server. See FIG. 1. The Providers' uploaded data will be converted from text based values to Vectors for storage on the Server.
(2) Server Functions The Server processes incoming uploads from the Providers, converts their data to vector-based data, and inserts the data into the live database that Users will be searching. The Server also needs to process incoming Search Requests from the Users, convert their data to Vector-based data and perform the matching calculations. In addition, the Server must maintain databases that contain User-Feedback information.
(3) User Search Requests and Results Page The Users download one of the software packages that allow them to Search the vector-tagged database for matching items, and to provide feedback to the system. All Search requests are broken down into three parts:

1. Words of the Search Request from the User;
2. User's Context (also referred to as personal preference values) in the Search Request;
3. User's Acceptance to use Feedback from Other Users matching their personal preferences in the Search Request.

All Search Requests typically are based on matching the words first, then context second, and user feedback third. However, any of these parameters may be used in any combination and weighting to achieve the desired search results.

Instead of text-string matches, the vector-tagged system first converts Words, Context and User Feedback parameters into Vectors which are then used to calculate matches using Vector-based functions.

Words are matched using either Theta angle differences (C–S Inequality) or Prime Number Mod (modulo) calculations. Both are implemented in this embodiment.

Context matches are based on Theta angle differences in this current embodiment.

User Feedback databases are smaller subsets of the main database with ratings information from the Users. The Search and matching process is the same with these smaller databases as the general database.

Coordinate System and Mappings

The basis for the system is a Word-Vector model of a language, in this case, English.

This Word-Vector model is based on the Cartesian coordinate system that maps Words of the language to points in the coordinate system. Words are grouped in space by similar definition, or arranged in a particular manner in the model space based on the meaning or definition of the Word, or arranged in relative positions to other Words depending on the Word.

The Word-Vector model, in this embodiment, is a three-dimensional space, with each Word mapped as a Vector to a particular point in space, and located on a conic surface with an angle from the x, y plane that is pre-assigned for Words of a particular category.

For instance, the Word "dog" might be mapped to a coordinate in space consisting of three points: x, y, and z in such a manner that the z coordinate falls on the conic surface that are predefined as "pets" or "animals".

Words of similar definition are also located in such a manner that they are mapped to a conic surface from phi angle 0 degrees to 180 degrees along the horizontal plane and at a delta angle from 0 degrees to 180 degrees in the vertical plane.

For another example, the user may consider words defining size. In the method of this invention, one can arrange the Words in such a manner that the Word infinitesimal is located at say some low end x, y, z coordinate, and the Word humongous located at a high end x, y, z coordinate on a predefined conic surface at some angle with the x-y plane having been pre-defined as "size". Words of intermediate sizes (i.e. small, little, average, big, large, etc) will need to be located in their relative positions and have x, y and z coordinates assigned to those Words so that a consistent tracking from low to high size is established.

For another example, Words defining color can be mapped in a likewise fashion. Similar to "size" Words on a conic surface named "size", the system could establish a conic surface at a different angle from the x-y plane and call it "colors". Each of the color words are mapped to a different coordinate. See FIGS. 4-6.

One can visualize where this is all leading by considering what it means when someone asks about finding a "lighter" color than a current color. On the conic surface, the lighter colors are evidenced by selecting an angle within the pre-defined sections of the conic sections where the lighter colors are located (i.e., the right side of FIG. 5).

Providers and Users can start visualizing each others' values by some angle in space rather than two distinct textual Words. Multiple lookup tables convert words to vectors. The look-up tables are predefined, usually by the service provider. Multiple if-then-else statements process the vector mathematics to ultimately achieve Word match issues.

One of the reasons for locating the Words in particular locations is for consistency in the model and for maintaining order when updated models are shared among several Users of the system.

Converting Text Words to Vectors

One database is required to store each English Word and its associated Vector. This database is referred to herein as the Word-Code database. Utilizing the information above, all Words in the English language to be used in the database must be manually calculated and placed in the Word-Code database on the proper conic section and at the proper location. This location is established by using concepts above. Implementation of several Word-Code databases may be based on industries or social groups or other community structures to help reduce the size of the database, along with a means to allow combining them with each other to build large databases.

Anytime the Server needs to convert a Word into a Vector, it will use this table as a lookup table for the Word and extract the x, y and z coordinate for that Word.

Users and Providers on the system do not have direct access to this conversion process as it is performed on the Server, by the Server process.

Converting Context (Personal Preferences) to Vectors

A second database, the Context Lookup database, is needed to lookup each Vector Value for each Context item. The Context Value typically is a single number, a one-dimensional Vector, basically a scalar number such as 5 or –1 or 54, which will be used by the Server to calculate Context Value matches.

Users and Providers of the system do not have direct access to this conversion process as it is performed on the Server, by the Server process.

Additional Personal Preference Features

Another important application is allowing users to find things that they want to change or "grow" into. The "change" or "growth" vector is a vector that can be attached or tagged to a website. Users can search on "where they are" and "where they want to be." Providers of services (e.g., educational companies) or products (e.g. self help books) could tag their products with the "change" vector. Then the user would be searching similarly to the above-noted system. See FIG. 6.

A user's preference values can change over time, and the system can be configured to account for these changes automatically. For instance, if the software knows a date of birth, it can get the current date and calculate the years for plugging in and changing a demographic in a user's contextual profile. Over time, preference values (i.e., personal theta) will slip outside the values that certain websites are interested in capturing, thereby changing search results.

Of course, the system allows a user to edit the amount of data that changes over time. For instance, in one embodiment, the system allows a user to select what they are currently and what they want to be some day.

Mapping Values x, y, and z for the Words

Although difficult to find, all mappings for words may be in Prime Numbers and calculated to fall on the proper conic section for that Word. This Operating Embodiment refers to this as the Prime Number Word-Code. The system of this invention also encompasses the use of integers, real and imaginary numbers for all Word mappings in a Word-Vector Model. This will allow an easier task of mapping all the Words in any language. These mapping systems are referred herein as the Non-Prime Number Wordcode.

Prime Number Mappings

Each Word in the language is given an x, y and z coordinate that each are Prime Numbers. These are stored in WordCode for lookup by the system for conversions of Words to Vectors. When a Provider uploads a site with Words, the Server will convert the Words to Vectors with Prime Numbers for x, y and z components. These are called Prime Vectors.

In addition to the conversion, the Server will also multiply together all of the Prime Vectors for the Words in the description and store the x, y and z components in particular columns in the database. For example, the Provider may upload a web site with a 4-Word description: "discount used cars trucks". The Prime Vectors for this search may be denoted V1, V2, V3, and V4. Their Prime Vector x, y and z components will be multiplied and stored in the database:

V1=3, 7, 11 discount
V2=13, 3, 11 used
V3=17, 5, 23 cars
V4=11, 23, 3 trucks

The Server will multiply all the Vector components and store them in the database:

The totals when multiplied are: 7923, 2415, 8349. This specification refers to this product as a Vector cloud—4 distinct Words are combined into a new Vector. With this information, one can easily find if any one of the four Words exists in this Vector as follows:

Assume a User does a Search using two Vectors: V2 and V3 (i.e. "used" and "cars"). The Server process gets these values, multiplies these two together and gets:

$$V2*V3=221, 15, 253$$

Then check to see if these two Vectors exist in the cloud (i.e. does "used" and "cars" exist in "discount used cars trucks"?).

The system performs this check this by dividing the Total by V2*V3 using MOD function (modulo). If the remainder is 0 then there is a match. This can be done for any number of Vectors up to the Vector count that created the total Vector cloud.

Due to the properties of Prime Numbers, one can calculate whether any Word exists within a group of Words and be assured that if the remainder comes back as 0, then the Word exists.

Note that the same three points can be mapped using polar coordinates and this model will use both although it is not implemented in this embodiment. Some Words may be located in the model space randomly as they may be difficult to establish a location in the space with any relevancy to another Word. For clarity, this specifications uses 3-d space and conic mapping surfaces, but other dimensions and surfaces can be used.

Provider's Ratings for a Customer Type

The ratings values used in this system, referred to herein as Context, are a key element in this Search process. Typical Context may consist of items such as a Customer's age, height, weight, home location, work location, sports interests, cultural interests, profession, skill levels at various items, and other items. The Context items can be added to or removed from the system as required by the type of Search service.

For example, if this Search engine is set up for homebuyers and sellers, the Context items used in the system can focus on the house types, location, cost, room sizes, colors, etc. and not have ratings values for books or movies. It is flexible and can be adjusted to meet the needs of the Providers and Users.

As Providers use the system, they will undergo a process that essentially is as follows. First, select a blank customer type and save it as a file name. This is saved as a small, empty database consisting of 19 rows and several fields. See FIG. 10. Open the customer file and have it ready to accept values from the Context editor. Context items and associated pop-up values from a standard database will be loaded into the Context editor. See FIG. 3. These are typically Word phrases to allow easy understanding of what is being rated.

Providers select any one of these Context item to rate, display its standard choices in the pop-up box, and select a pop-up value. This is the rating or Value. FIG. 6, Ref. 37.

The pop-up value selected is loaded into the customer file and stored. This process is continued until all the Context items have been rated and stored in the customer file.

Close the standard database. Close the customer type file.

Step by Step Process—Detailed

Provider Upload of Searchable Data (URL):

Activate the Server processes. These include Provider Upload Processes, Text Words to Vectors Conversion, Context Words to Values Conversions, User Search Requests, User Feedback, MSSQL database processes, and Admin function processes. The MSSQL processes all of the database conversions and matching. The Server sits and waits for requests until shut down.

A Provider wishes to upload their company URL of their web site to the Server. They also want to associate a customer type with the URL. The Provider activates the Provider Software Package. The Provider downloads a standard database of editable items that both Providers and Users will use in this system. The Provider stores this database as a file with a unique filename, possibly reflecting the type of customer they would like to attract to the site, such as "new home buyer 1" or "board game player 3". The standard database is not changed in this process. Any time a new character is created, it is copied from the standard database.

This standard database is actually 11 standard databases—one main database and 10 smaller databases. The smaller databases are single row databases referred to as Row10.mdb, Row11.mdb, etc. up to Row19.mdb. The main database is 19 rows deep by 189 fields wide and initially is blank with regard to editable items. Most of the fields are system fields. Only 10 of the fields contain the results of the editable items. The main database is stored as the character name selected in the initial download. The main database is a combination of the vector-tagged system process and administration items in Rows 1 through 5, text Words in Rows 6 through 9, and a copy of the 10 smaller databases in Rows 10 through 19. All of the information used in the process, whether Provider uploads, ratings, Server process, User Searches, pop-ups, etc. are based on this neat, compact database. This setup will help with managing version control. Initially, in this embodiment, this file is relatively small, but the files may be combined with other files without loss of data integrity on a Row by Row basis.

The Provider edits the settings for the User type they want to "attach" to their web site. Basically, this is a hypothetical customer that may exist in the User domain. These settings are unique to that hypothetical User type for that URL. An example of possible settings might include: favorite color—red, or age—between 30 and 35, or favorite types of literature—science fiction. The settings are manipulated through a tree control with pop-up menus. As Users click on various categories to edit, the system pulls information from the Row databases and displays it in a tree view, similar to a MS Windows® directory view. The Provider selects a category to rate, clicks on it, and a pop-up displays the choices available. The information in the pop-up is read from the same Row database.

The Provider can store Context settings only in Rows 10 through 19 in this embodiment. The database structure is transparent to the Provider or Users of the system. The Provider software handles all of the storage of selected and rated items. As the Provider clicks and selects on different categories, the selections are held in a temporary array. Once completed with edits for a particular database Row, the information is transferred from the temporary array to the database file for that Row and then the Row is copied to the Main character database. The choices that people have for editing settings are essentially unlimited.

The Provider enters Words into a text box on the editor screen describing their web site.

The Provider clicks the Attach button. The Attach command results in the main database being copied to a new temporary upload database file (in this case, MS Access®) with all of the information regarding the URL, the Words describing the website, and the edited Context of the User Type. This file is given a name with a random number in its name and is stored temporarily on the Providers computer in a directory designated for uploads. The file is given a name with a random number to avoid multiple Providers uploading the same name file to the Server. The Provider clicks a button labeled "Upload to Server" which activates an Active Server Page associated with Provider data uploads. This page is from the Server. The data is then loaded to the Server and the Provider can save the information, create a new file or close the program.

Server Process-Uploads and Lookups

Providers and Users of the system send data from their database files through an array of variables in an HTML page large enough to hold all of the data from each field of the database file. The Provider Upload HTML page is served by the Server. The ASP Provider Upload page gets all of the variables from the HTML page and loads them into a temporary array.

The ASP page contains code that extracts the information from the temporary array, opens the database file, and writes the information as a single record to the database and then closes the database. This initial upload contains only raw Words and Context Values and no Vectors. The Vector Conversions must be performed on each raw record.

In order to do this, the Server keeps a list of each record uploaded to the Server from any of the Providers. Recall from number 8 above that each filename uploaded to the Server contains a random number in the name to prevent duplicate filename uploads. The list is a text list of all the random number file names. This list represents the file name sent to the Server and the name of the record in the Server database.

Each upload to the Server will need to be processed to get it into a format suitable for the Users to Search. In order to do this, the sever will sequentially go through the list of files that were uploaded, get the corresponding record in the database, open the record, read the contents, process the record with Word-Vector and Context Value lookups and update the record. The filename is then deleted from the list once processing is complete.

There are two lookups needed to update each record. The first is a lookup of Words in the record to the corresponding Vector in the Wordcode database. The second is a lookup of Context to the corresponding Context Value in the Lookup_Real database.

The Server will perform the lookups and write the Vectors back to the record and close the record.

The Server will continue to run, serving files, making lookups, updating the Search database, performing Search matches for Users, etc. until the machine is turned off.

User Software Operation:

The User Activates the User Software Package in order to be able to Search the vector-tagged database.

The software is essentially the same as the Provider software in that a User can download a standard database file, give it a name, edit the settings and save the file to the Users computer. Basically, the User is creating a profile using the same standard database that the Provider used when setting up a theoretical customer type.

The User will Search the VectorTagged files in the database by sending his or her request through a Search Form. The Search form is a MS Windows form which contains a browser that displays an HTML page from the Server.

The User will enter Search phrase Words in the text input box, select a character with edited Context to associate to the Search Words and click "Search" button. The User's Words and Context are sent to the HTML form similar to the Provider upload process.

The User clicks "Submit" located on the HTML form which activates the Active Server Page to read all of the variables in the form, and for each Word, lookup the Word-Code database to get the Vectors. For the Context, the ASP page will perform a lookup the Context Values. The ASP page then performs a calculation on each record in the database using the Word Vectors and Context Values in the Search Request against the Word Vectors and Context Values in the current record in the database. The Theta angle for the Words and Context Values are calculated for each record. If the Theta angle meets the criteria of the User, the record is sent back to the User as a Match.

Feedback Model for User Searches:

To ensure quality Search results, the system will utilize a User Feedback Ratings process. For every URL match sent back to the User as a valid match, the User may click on the URL and determine if the site is a valid site from their perspective. After reviewing the URL, the User can go back to the Search Form Results Page, click on the Feedback button for that URL and rate the site on a variable scale from 0 to 10 or some other scale reflecting low quality to high quality. This is referred to as the Quality Ratings Value. The User will click Submit Feedback button and the information will be sent back to the Server and stored in a User Feedback Database. Over time, the User Feedback database will contain numerous entries consisting of URL, User Context Ratings, and the Quality Ratings Values.

The significant feature of this system is that the Quality Ratings Values are directly associated with User Context Ratings. Users can specify in their Search Requests the ability to utilize User Feedback in the Search. If enabled, the User will not be searching in the general database described previously; he or she will be performing searches in smaller databases that are associated with the Context Values that a User specifies for the Search. These are referred to as Context-Specific Databases.

If the User elects not to use User Feedback, the Search is made on the general database. Another important use of the User Feedback is to allow Providers to access information on their uploaded sites, which would include the feedback ratings for their site on a Context Value basis. Providers can know immediately how well their web site and hypothetical customer compare against the real world User feedback. Providers can adjust the customer type for the same URL or change what they are selling and keep the same customer type. Over time, the User Feedback model will be able to contain 100 million web sites (and changing daily) in terms of Context Values in multiple databases. Under the current embodiment, there are 10 Rows×10 Ratable Items*15 Pop-Up values for each Ratable item resulting in 1500 possible variations in Context Values. A service provider would set up 1500 databases to reflect each of these Context Values and store rated URLs in the databases based on the Context Value of the User and the Quality Ratings Value. That would be approximately 67,000 records per Context Value Database, easily manageable.

Server—Search Processes:

The Search process uses an HTML/ASP page combination as described above. The calculations to determine a match are based on a formula that calculates the angle difference between one set of Vectors in the User Search with the set of Vectors in the current database record being checked for a match. The User can perform a Search on Word Vectors only, Context Values only, Quality Ratings Values only, or combinations of these parameters. The first two parameters are determined by the User by establishing the percentage requirement for these parameters.

The Server opens the database and for each record will calculate the angles for the Words and the Context. If the angles do not meet the requirements established by the User, the record is not considered a match, and the process will go to the next record and so forth until all records are checked. If Quality Ratings Values are to be used, the Server will get the Context Values from the User, and open the database associated with those Context Values for Searches.

Computer Implementation

The method of this invention is most conducive to implementation in a computerized process. A computer program product can therefore incorporate each aspect noted above to provide electronic file search capabilities. The computer program product includes a computer readable storage medium for storing words and phrases. The words and phrases of this invention are referred to generally as text elements without limiting the nature of the language in use. The storage medium stores vector assignment commands that are executable by a processor to assign a unique vector to each text element. The vector represents the location of each respective text element in spatial coordinates. The computer storage medium further includes vector comparison commands for determining the degree of separation between the respective spatial locations assigned to at least two text elements, wherein the degree of separation indicates the similarity or dissimilarity of the text elements.

The vector assignment commands include a database in which each entry in the database is a unique set of vector coordinates for assigning to a corresponding text element on said storage medium. The storage medium has a processor programmed to determine the angle between vectors assigned to text elements. The processor calculates the angle between vectors using vector mathematics, such as the well-known Cauchy-Schwartz inequality.

The vector assignment commands create rated vector objects of numerical text, the numerical text indicates a preference value for a file. The text elements are words and numbers used in an electronic file. As discussed in detail above, in one embodiment, the text elements are search terms and the vector comparison commands calculate the degree of separation between (i) the search term vectors associated with the search terms and (ii) each respective set of vector coordinates in said database.

A user, or searcher, can tell the system how close search results should be to be considered a match. For instance, the user can specify in a search that the angle theta between 0 and 30 degrees is a match, and anything with a theta greater than 30 degrees should be ignored. In this case, the numerical value of 30 degrees is the separation acceptance identifier allowing the system to determine which website vectors in the system database are sufficiently close to the user's search term vectors and appropriate for outputting to the user.

On the service provider's side of a network, a master database is presented for recording all vector coordinates associated with a plurality of electronic files, wherein the vector coordinates corresponding to each respective file are systematically organized for retrieval.

Overall, the system disclosed herein is a method for a computer processor to determine whether individual search terms match the content of a respective file that is part of a global electronic filing system. The method uses a first step of a search user or a content provider uploading search term text elements over a computer network to a file server system. To accommodate the search, the method includes the step of uploading file descriptor text elements over a computer network to a file server system and assigning a unique vector to all of the text elements. Accordingly, the search user text elements and the content (file) provider text elements are all converted to vector coordinates, usually through a look-up table. Overall, the step of assigning the vectors includes identifying the uploaded search term text elements and the uploaded file descriptor text elements and selecting the appropriate vector for each term from a vector look-up table.

The vectors represent a location for each respective text element in spatial coordinates. The system completes the search by determining the degree of separation between the respective spatial locations assigned to at least two text elements, wherein the degree of separation indicates the similarity or dissimilarity of the text elements.

To utilize the method most efficiently, prior to uploading search term text elements or file text elements, the method includes the step of creating a descriptor database template to provide context information associated with either the file text elements or the search text elements. The file author edits the descriptor database template to include the file descriptor text elements that describe the file being uploaded to the global filing system, and the file author uploads the edited template with the file to the file server system. Likewise, the user/searcher edits a descriptor database template to include preference values for comparison with file descriptor text elements.

The steps of editing the descriptor database template associated with either a content provider's file or a search includes incorporating context values for comparing the file's content with user search terms. A global filing system searcher attaches the edited template to a search request and allows the system to include more contextual or personal information about the user/searcher than would be available in state of the art search tools.

The computerized method and computer program product of this invention provide more efficient search tools because vector mathematics allow for extremely rapid comparison of a search string paired with a user's descriptor database template (i.e., a preference profile) and a stored file or webpage paired with a content provider's descriptor database template.

As discussed above, the computerized method and computer program product compare all of the vectors associated with the text elements in a search, along with the vectors in the user's descriptor database template and determines the degree of separation between those vectors and a content provider's corresponding vector tagged files. In one embodiment, the step of determining the angle between given vectors utilizes the Cauchy Schwartz Inequality or prime number mapping. Ultimate, the computer program returns a search result to the searcher, wherein the search results include files within the filing system having vectors that are spatially located within the acceptable degree of separation. The searcher assigns a quality rating to a file included in the search result, wherein the quality rating is transmitted back to the global filing system. As the filing system records these ratings, they provide additional data to assist in narrowing search results for users with similar database descriptor templates.

In a final embodiment of the disclosed system, files may be embedded with binary codes representing vectors. In this scenario, the files in any format include vector-tagged information in their native format on the global file server. The vector tags could be include as binary values or even symbols that have a larger meaning. If needed, the system could encompass the ability to incorporate vector tags by a drag and drop function by which an icon is selected and dragged by a mouse to the selected file.

Those having skill in the art will recognize that the invention may be embodied in many different types of bipolar device structures. Accordingly, the invention is not limited to the particular structures illustrated herein.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A computer program product for providing electronic file search capabilities comprising:
   a computer readable storage medium for storing text elements thereon;
   vector assignment commands stored on said storage medium, said vector assignment commands executable by a processor to assign a unique vector to each of said text elements, said vector representing a location of each respective text element in spatial coordinates;
   a database storing said spatial coordinates on said computer readable storage medium;
   vector comparison commands stored on said storage medium for determining the degree of separation between respective spatial locations assigned to at least two text elements, wherein the degree of separation indicates the similarity or dissimilarity of the text elements;
   wherein said text elements comprise search terms and said vector comparison commands calculate the degree of separation between (i) the vectors assigned to the search terms and (ii) other vectors in said database; and
   wherein said text elements include a separation acceptance identifier for determining which other vectors in said database are sufficiently close to said search term vectors for outputting to a user.

2. A computer program product according to claim 1, wherein said storage medium comprises a processor programmed to determine an angle between vectors assigned to text elements.

3. A computer program product according to claim 2, wherein said processor calculates the angle between vectors using the Cauchy-Schwartz inequality.

4. A computer program product according to claim 1, wherein said vector assignment commands create rated vector objects comprising numerical text, said numerical text indicating a preference value for a file.

5. A computer program product according to claim 1, wherein said text elements are words and numbers used in an electronic file.

6. A method for a computer processor to determine whether individual search terms entered by a searcher match the content of a respective file that is part of a global electronic filing system, the method comprising:
   uploading search term text elements over a computer network to a file server system;
   uploading file descriptor text elements over a computer network to a file server system;
   assigning a unique vector to all of said text elements, said vectors representing a location for each respective text element in spatial coordinates;
   determining a degree of separation between respective spatial locations assigned to at least two text elements, wherein the degree of separation indicates the similarity or dissimilarity of the text elements;
   returning search results to the searcher, wherein the search results include files within the filing system comprising vectors that are spatially located within the acceptable degree of separation.

7. A method according to claim 6, wherein prior to the step of uploading search term text elements, the method comprises the step of creating a descriptor database template.

8. A method according to claim 7, wherein a file author edits the template to include file descriptor text elements that describe a file being uploaded to the global filing system and wherein the file author uploads the edited template with the file to the file server system.

9. A method according to claim 8, wherein the step of editing the template comprises incorporating context values for comparing the file's content with user search terms.

10. A method according to claim 7, wherein a global filing system searcher edits the template to include preference values for comparison with file descriptor text elements.

11. A method according to claim 10, wherein a global filing system searcher attaches the edited template to a search request.

12. A method according to claim 6, wherein the step of assigning the vector comprises identifying the uploaded search term text elements and the uploaded file descriptor text elements and selecting the appropriate vector for each term from a vector look-up table.

13. A method according to claim 12, wherein the step of determining the degree of separation between vectors comprises determining the angle between the vectors.

14. A method according to claim 13, wherein the step of determining the angle comprises calculating the Cauchy Schwartz Inequality.

15. A method according to claim 12, wherein the step of determining the angle comprises calculating the prime number mapping.

16. A method according to claim 6, wherein the text elements comprise a search term element and a file descriptor element, further comprising the step of assigning an acceptable degree of separation between the search term element and the file descriptor element.

17. A method according to claim 16, wherein the searcher assigns a quality rating to a file included in the search result, wherein the quality rating is transmitted back to the global filing system.

* * * * *